United States Patent [19]

York

[11] Patent Number: 5,147,896
[45] Date of Patent: Sep. 15, 1992

[54] FOAM BLOWING AGENT COMPOSITION AND PROCESS FOR PRODUCING FOAMS

[75] Inventor: Robert O. York, Wilmington, Del.

[73] Assignee: E. I. Du Pont de Nemours and Company, Wilmington, Del.

[21] Appl. No.: 702,285

[22] Filed: May 20, 1991

[51] Int. Cl.$^5$ .................................................. C08J 9/14
[52] U.S. Cl. .................................... 521/79; 521/98; 521/146
[58] Field of Search ........................... 521/79, 98, 146

[56] References Cited

U.S. PATENT DOCUMENTS

| | | | |
|---|---|---|---|
| 3,668,155 | 6/1972 | Raley, Jr. | 521/79 |
| 3,912,667 | 10/1975 | Spitzer et al. | 521/98 |
| 3,983,080 | 9/1976 | Suh et al. | 521/98 |
| 4,086,192 | 4/1978 | Raley, Jr. | 521/98 |
| 4,101,467 | 7/1978 | Park et al. | 521/79 |
| 4,226,946 | 10/1980 | Park et al. | 521/98 |
| 4,258,300 | 3/1981 | Park | 521/79 |
| 4,308,352 | 12/1981 | Knaus | 521/95 |
| 4,317,888 | 3/1982 | Watanabe et al. | 521/91 |
| 4,343,913 | 8/1982 | Watanabe et al. | 521/94 |
| 4,345,041 | 8/1982 | Hoki et al. | 521/79 |
| 4,368,276 | 1/1983 | Park | 521/94 |
| 4,387,169 | 6/1983 | Zabrocki et al. | 521/79 |
| 4,422,877 | 12/1983 | Spitzer et al. | 521/79 |
| 4,431,575 | 2/1984 | Fujie et al. | 521/94 |
| 4,916,166 | 4/1990 | Suh et al. | 521/98 |
| 5,006,568 | 4/1991 | Fukazawa et al. | 521/98 |
| 5,011,866 | 4/1991 | Suh | 521/98 |

*Primary Examiner*—Morton Foelak

[57] ABSTRACT

This invention relates to the use of polyfluorocarbon blowing agents in the preparation of polymer foams; particularly the use of 1,1-difluoroethane in the preparation of polystyrene foams for food packaging and food serving.

1 Claim, 3 Drawing Sheets

FOAM BLOWING AGENT COMPOSITION AND PROCESS FOR PRODUCING FOAMS

FIELD OF THE INVENTION

This invention relates to a blowing agent composition and the method used to prepare a polymeric foam, particularly a styrenic or ethylenic foam.

BACKGROUND OF THE INVENTION

Thermoplastic foams made from styrenic polymers such as polystyrene have found extensive use, particularly in food packaging and food service applications. The key to a successful polystyrene foam for food applications is to use a blowing agent composition during the formation of the foam that diffuses out of the cells and is substantially replaced by air before the foam comes into contact with any food to be packaged or served.

Generally, polystyrene foams are manufactured by mixing a volatile blowing agent with the styrenic resin under a controlled temperature and pressure sufficient to plasticize the resin and to maintain the resin blowing agent composition in an unfoamed state. Thereafter the molten mixture of resin and blowing agent and sometimes a nucleator is extruded through an annular die into a zone of lower temperature and pressure. If extrusion conditions are optimum, a tube of rigid, closed cell foam will be produced.

This tube is usually stretched over a mandrel of larger diameter. Stretching not only yields a larger tube of foam but also "orients" and strengthens or toughens the foam.

The tube is then slit and opened up to form at least one flat sheet. The sheet (or sheets) is usually stored in large rolls and aged for at least 24 hours. The aging process is required to obtain "post expansion" during the subsequent thermoforming operation.

"Post expansion" refers to the swelling of the foam as it is heated in the thermoformer oven. This expansion is the result of the different permeation rates of air and the blowing agent through the foam cell walls. As the foam emerges from the die during the extrusion step, the cells containing the blowing agent tend to expand until the pressure within the cells equals the atmospheric pressure outside the cells. During the aging period, air permeates rapidly into the cells; but the blowing agent (having a larger size molecule than air) permeates out relatively slowly. The result is an increase of cell gas pressure during aging. The gas pressure increases from 1 atmosphere to about 2 atmospheres. When the foam is subsequently heated and softened, this increased gas pressure causes the foamed product to expand further, i.e., "post expand".

Dichlorodifluoromethane (CFC-12) historically has been the blowing agent of choice in producing polystyrene foam. With the planned phase-out of CFC-12 as a foam blowing agent because of its measurable undesirable Ozone Depletion Potential (ODP) and the unacceptability of chlorodifluoromethane (HCFC-22) as a long term alternative blowing agent in food packaging/food service use, there is a critical need for an acceptable alternative blowing agent. Hydrocarbon blowing agents, although having zero ODPs, are less desirable for use in food containers since they are classified as photochemically reductive volatile organic compounds (VOCs) and their use is regulated by law.

It is an object of this invention to provide a blowing agent for thermoplastic polymers such as polyethylene or polystyrene or the like that displays a zero ODP and is not substantially photochemically reactive, that can be processed in a manner such that it diffuses substantially completely from the ultimate foamed product, and that, even if a slight amount remained in the product, it would be so low as not to be considered a component of any food served or contained within the foamed product.

It is a further object to provide an operable process for utilizing the aforementioned blowing agent in the manufacture of a polymeric foam product, particularly in the manufacture of a foam of a thermoplastic composition such as polyethylene or polystyrene or the like.

SUMMARY OF THE INVENTION

The invention comprises a polymeric foam product prepared from a foam-forming composition containing up to about 20 weight percent based on the total weight of the composition of at least one polyfluorocarbon blowing agent selected from the group consisting of 1,1,-difluoroethane (HFC-152a); 1,2-difluoroethane (HFC-152); 1,1,1,2-tetrafluoroethane (HFC-134a); 1,1,2,2-tetrafluoroethane (HFC-134); 1,1,1-trifluoroethane (HFC-143a): and 1,1,2-trifluoroethane (HFC-143); pentafluoroethane (HFC-125), preferably HFC-152a and HFC-134a, and most preferably HFC-152a. Of course, nitrogen, carbon dioxide, other inert gases, hydrocarbons and chemical blowing agents can be used in conjunction with the polyfluorocarbon blowing agents.

The ultimate polymeric foam product of this invention is characterized in that the cells of the foam contain no substantial amount of the polyfluorocarbon blowing agent. The cells of the foam are substantially completely filled with air, making the foam produced suitable for food contact applications.

As stated above, HFC-134a and HFC-152a are preferred in polystyrene and polyethylene foams. HFC-134a works better in polystyrene insulating foams because of its slower permeation rate. This yields better long-term insulating properties. The use of HFC-134a in preparing styrenic insulating foams or boards will most likely require modification of the conventional equipment because of its higher solution pressure in polystyrene resin (higher than the solution pressures of the currently used blowing agents, i.e., CFC-12, HCFC-142b, CFC-11).

The preference for HFC-152a in polystyrene and polyethylene packaging foams is based on the following four characteristics:

1. Low environmental impact: zero ODP, very low HGWP, (halocarbon global warming potential) or "greenhouse effect", and has been added to the list of organic compounds which are negligibly reactive and thus may be exempt from regulation under state implementation plans (SIP's) to attain the national ambient air quality standard (NAAQ's) for ozone;

2. Low molecular weight: less amount of HFC-152a is required to achieve similar density as existing foams;

3. Low cost per pound; and

4. Rapid diffusion from foams: imperative for food service and food packaging applications.

HFC-152a is also the preferred polyfluorocarbon blowing agent for polyethylene foam insulation. Although, both HFC-152a and HFC-134a permeate within a few days from polyethylene foams and, therefore, do not contribute to long term insulating value, the higher efficiency of HFC-152a in the preparation process and its lower cost per pound make it preferred for polyethylene foams.

The invention also provides a method for use of the blowing agent composition which comprises foaming a mixture of a styrenic resin and the polyfluorocarbon blowing agent composition to produce a styrenic foam. In a preferred embodiment of the method of the invention, the method comprises producing a styrenic foam by heating a styrenic resin in an extruder to produce a molten resin; introducing into the molten resin a blowing agent comprising at least one of the aforementioned polyfluorocarbons, preferably HFC-152a or HFC-134a to produce a plasticized extrusion mass under a pressure sufficient to prevent foaming of the extrusion mass; and extruding the extrusion mass through a die into a zone having a temperature and pressure sufficient to permit foaming of the extrusion mass to produce the styrenic foam.

The packaging foams should be produced using no added water, preferably in the absence of any water. It has been found that the use of water in polyethylene and polystyrene foam production causes large unacceptable voids (steam pockets) in the resulting foam product. It is believed that this is due to the poor solubility of water in these polymers. However, small amounts of water (1-4 wt. %) may be used if an appropriate solubilizing or dispersing agent (alcohol, glycol, surfactants, etc.) is also used.

In the preparation of foams in accordance with the method of the invention, it is often desirable to add a nucleating agent to the styrenic resin. These nucleating agents serve primarily to increase cell count and reduce the cell size in the foam and are used in an amount of about 0.1 part by weight to about four parts by weight per one hundred parts resin. For example, talc, sodium bicarbonate/citric acid, gaseous $CO_2$, calcium silicate and the like are suitable nucleating agents for reducing cell size. Talc is a preferred nucleating agent component in the practice of the method of the invention. Various other additives, for example, fire retardant additives, color concentrates, stabilizers, anti-oxidants, lubricants, etc. may also be used depending on the end use of the styrenic foam.

The invention comprises a method for producing a styrenic foam having a thickness from about 0.04 to about 4.0 inches, using the blowing agent compositions of the invention.

Packaging foams are anywhere from 0.04 to 0.200 inches, while insulating foams may be as thick as 4.0 inches or higher. In the preferred method of the invention, a styrenic foam is produced from a "styrenic resin", which means a solid polymer of one or more polymerizable alkenyl aromatic compounds or a compatible mixture of such polymers. Such an alkenyl aromatic compound has the general formula:

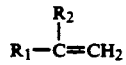

wherein $R_1$ represents an aromatic hydrocarbon radical of the benzene or substituted benzene series, and $R_2$ is either hydrogen or the methyl radical. Examples of such alkenyl aromatic compounds are styrene, alphamethyl styrene, ortho-methyl styrene, meta-methyl styrene, para-methyl styrene. The solid copolymers of one or more of such alkenyl aromatic compounds with amounts of other polymerizable compounds such as methylmethacrylate, acrylonitrile, maleic anhydride, acrylic acid and the like are also operable in this invention. The preferred styrenic resin is the homopolymer, polystyrene, which is readily available from various sources.

In the method of the invention, the styrenic resin is mixed with a blowing agent composition and the resulting mixture is then foamed. Preferably the foaming is carried out with the use of an extruder, wherein the styrenic polymer is heated to about 400°-450° F. to produce a molten polymer and the blowing agent is then introduced into the extruder where it is mixed with the molten polymer under pressures such that the resulting plasticized extrusion mass does not foam, but its viscosity decreases. The extrusion mass is then cooled. Cooling increases the viscosity and the melt strength of the mass prior to extrusion. The mass is then extruded through a die of any desirable shape of a controlled temperature, usually about 300° F., the reduced pressure outside the extruder permitting the extrusion mass to foam.

The temperature and pressure conditions under which the styrenic resin and blowing agent mixture will not foam will depend upon the particular styrenic resin used and generally, will be at a temperature between about 240° F. and about 440° F. and a pressure above about 600 psig.

The conditions of temperature and pressure under which the extrusion mass will foam, again will depend upon the precise styrenic resin used and generally will be at a similar temperature of about 240° F. and 440° F. but at a lower pressure. However, the more precise the temperature is controlled throughout the extrusion process, the more uniform the resulting foam.

The melt plasticization is controlled by the choice of the particular polyfluorocarbon blowing agent composition, the amount of and type of nucleating agent or other additive(s) present, the particular styrenic resin or mixture being used and the Tg or Tg's of the resin(s) and the temperature, pressure in the extruder and the extrusion rate. The shaping means used can also affect the orientation of the polymer.

In practicing the method of the invention, the blowing agent may be added to the styrenic resin in any desirable manner and, preferably, by injection of a stream of the blowing agent composition directly into the molten styrenic resin in the extruder. The blowing agent should be mixed thoroughly with the styrenic resin before the blowing agent and styrenic resin mass is extruded from the die. This is necessary to produce a foam having uniform density and cellular structure.

The extrusion mass comprising the molten resin and the blowing agent composition is extruded into an expansion zone within which foam formation and expansion takes place. Any suitable extrusion equipment capable of processing polystyrenic compositions can be used for the extrusion. Single or multiple-screw extruders can be used. Softening the polymer and mixing with the blowing agent take place during working of the polymer between flights of the screw or screws, which also serve to convey the extrusion mass to the extruder die. Screw speed and extruder barrel temperature should be such as to achieve adequate mixing and softening but not so high as to degrade the composition being processed.

The foams can be used in the form prepared, cut into other shapes, further shaped by application of heat and pressure or otherwise machined or formed into shaped articles of desired size and shape. The styrenic foams produced at this point where the polyfluorocarbon is still substantially retained within its cells have utility for insulating material.

For the foams to have utility in the food service and food packaging application, the tubular foamed product from the initial foaming zone or stage is fed over a mandrel of larger diameter to be stretched anywhere from 1.2 to about 5 times its original diameter.

After stretching, the tube is slit and opened to form a flat sheet. The flat sheet is stored on a roll. The rolls are aged in air over a period of at least about 24 hours but usually less than 2 weeks, i.e. sufficient time for air to permeate through the cell walls of the foam, but because of storage in rolls of foamed sheet, insufficient time for any substantial amount of the polyfluorocarbon blowing agent to diffuse out. The result is a substantial increase in gas pressure within the cells. When the foamed product is heated and softened in the final step of the process, the increased gas pressure causes the foamed product to expand further, i.e. post expand. The polyfluorocarbon then diffuses substantially completely from the final foamed product and is replaced by air.

Figure 1:
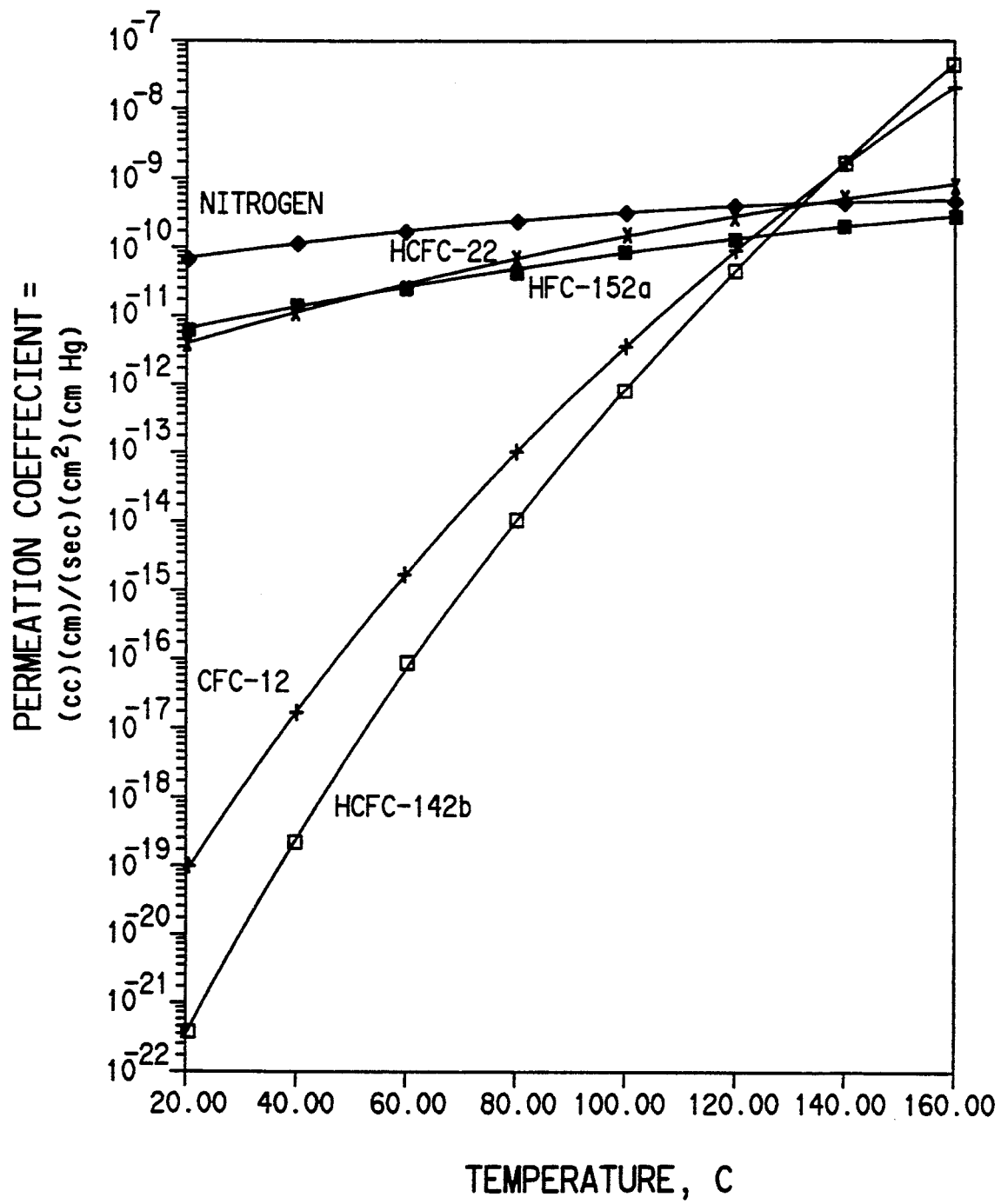
In FIG. 1, the permeation coefficient of HFC-152a is compared to the coefficients for CFC-12, HCFC-142b, HCFC-22, and nitrogen at temperatures of 20° C. to 160° C.

The following Examples are intended to illustrate the method of using the preferred polyfluorocarbon blowing agents to make the foamed products of the present invention.

EXAMPLE 1

In this example, polystyrene foam sheet was prepared using HFC-152a as the blowing agent; and was compared to a similar product prepared using HCFC-22 as the "control" blowing agent.

It was concluded that HFC-152a was a very efficient blowing agent. About 25 percent less of HFC-152a than the control was required to achieve a similar density polystyrene foam.

The post-expansion characteristics of foam sheet produced with HFC-152a were superior to foam produced with the control.

The polystyrene foam sheet using HFC-152a thermoformed into excellent quality egg cartons and hamburger containers.

The comparative test (HFC-152a vs. the control) was conducted using a conventional tandem extrusion system. Foam was extruded through an annular die, stretched over a mandrel about 4 times the die's diameter, and slit to produce a single sheet.

The extrusion system was started using the control blowing agent. After about 25 minutes, HFC-152a was introduced from cylinders pressurized With nitrogen.

In the following table, Table 1, the data using HFC-152a and the control as blowing agents are compared:

TABLE I

|  | HFC-152a | Control |
| --- | --- | --- |
| Extrusion rate (lbs/hr) | 700 | 700 |
| Blowing agent injection rate (lbs/hr) | 32 | 40 |
| Die pressure (psig) | 1100 | 1160 |
| Melt temperature (°F.) | 300 | 295 |
| Foam density (pcf) | 4.9 | 5 |
| Sheet gauge (mils) | 114 | 114 |

Foam sheet produced in this test using HFC-152a was successfully thermoformed after 7, 14, 21 and 28 days' aging, whereas the control failed to produce acceptable product after 21 days.

EXAMPLE 2

In the following table, Table 2, the important properties of HFC-152a and HFC-134a are compared to CFC-12 and HCFC-22:

TABLE 2

|  | CFC-12 | HCFC-22 | 134a | 152a |
| --- | --- | --- | --- | --- |
| Molecular Weight | 120.9 | 86.5 | 102 | 66 |
| Boiling point (°C.) | −29.8 | −40.8 | −26.5 | −25.0 |
| ODP | 1.0 | 0.05 | 0 | 0 |
| HGWP | 3.1 | 0.34 | 0.28 | 0.03 |

The ozone depletion potential (ODP) was calculated using the method described in "The Relative Efficiency of a Number of Halocarbon for Destroying Stratospheric Ozone: D. J. Wuebles, Lawrence Livermore Laboratory report UCID-18924, (January 1981) and "Chlorocarbon Emission Scenarios: Potential Impact on Stratospheric Ozone" D. J. Wuebles, Journal Geophysics Research, 88, 1433-1443 (1983).

Basically, the ODP is the ratio of the calculated ozone depletion in the stratosphere resulting from the emission of a particular agent compared to the ODP resulting from the same rate of emission of $CFCl_3$, (CFC-11) which is set at 1.0. Ozone depletion is believed to be due to the migration of compounds containing chlorine or bromine through the troposphere into the stratosphere where these compounds are photolyzed by UV-radiation into chlorine or bromine atoms. These atoms will destroy the ozone ($O_3$) molecules in a cyclical reaction where molecular oxygen ($O_2$) and [ClO] or [BrO] radicals are formed, those radicals reacting with oxygen atoms formed by UV-radiation of $O_2$ to reform chlorine or bromine atoms and oxygen molecules, and the reformed chlorine or bromine atoms then destroying additional ozone, etc., until the radicals are finally scavenged from the stratosphere. It is estimated that one chlorine atom will destroy 10,000 ozone molecules.

The ozone depletion potential is also discussed in "Ultraviolet Absorption Cross-Sections of Several Brominated Methanes and Ethanes" L. T. Molina, M. J. Molina and F. S. Rowland, J. Phys. Chem. 86, 2672-2676 (1982); in Bivens et al. U.S. Pat. No. 4,810,403; and in "Scientific Assessment of Stratospheric Ozone: 1989" U. N. Environment Programme (Aug. 21, 1989).

The global warming potentials (GWP) are determined using the method described in "Scientific Assessment of Stratospheric Ozone: 1989" sponsored by the U. N. Environment Programme.

The GWP, also known as the "greenhouse effect" is a phenonmenon that occurs in the troposphere. It is calculated using a model that incorporates parameters based on the agent's atmospheric lifetime and its infra-red cross-section or its infra-red absorption strength per mole as measured with an infra-red spectrophotometer.

$$GWP = \frac{\text{Calculated IR forcing due to agent}}{\text{Emission rate (steady state) of agent}}$$

EXAMPLE 3

The permeation and diffusion properties of HFC-152a relative to polystyrene were determined in this example.

In FIG. 1, the permeation coefficient of HFC-152a is compared to the coefficients for CFC-12, HCFC-142b, HCFC-22, and nitrogen at temperatures of 20° C. to 160° C.

Figure 2:
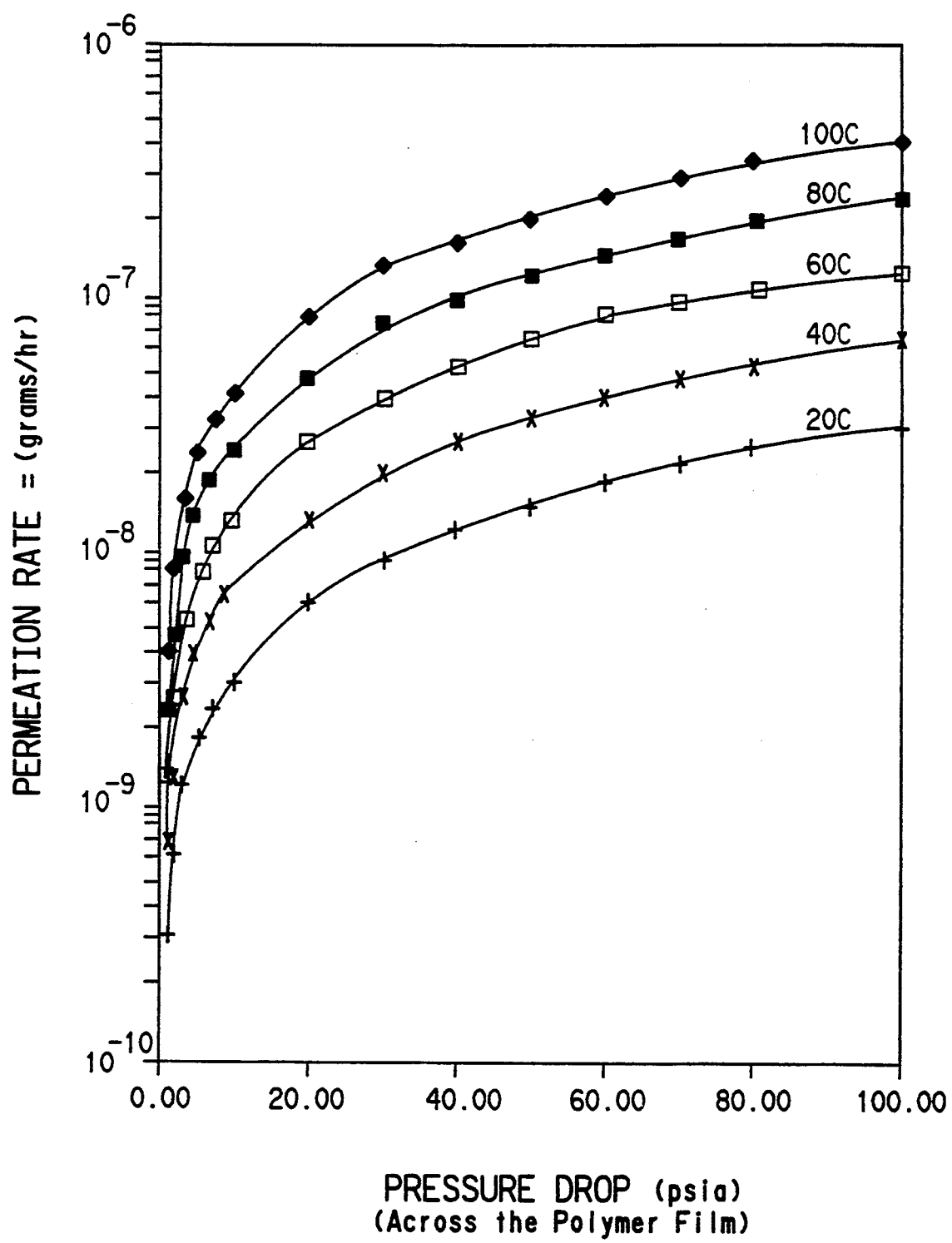
In FIG. 2, the permeation rate for HFC-152a through polystyrene film is presented for various pressure drops across the film at temperatures of 20° C. to 100° C.

In FIG. 2, the permeation rate for HFC-152a through polystyrene film is presented for various pressure drops across the film at temperatures of 20° C. to 100° C.

Figure 3:
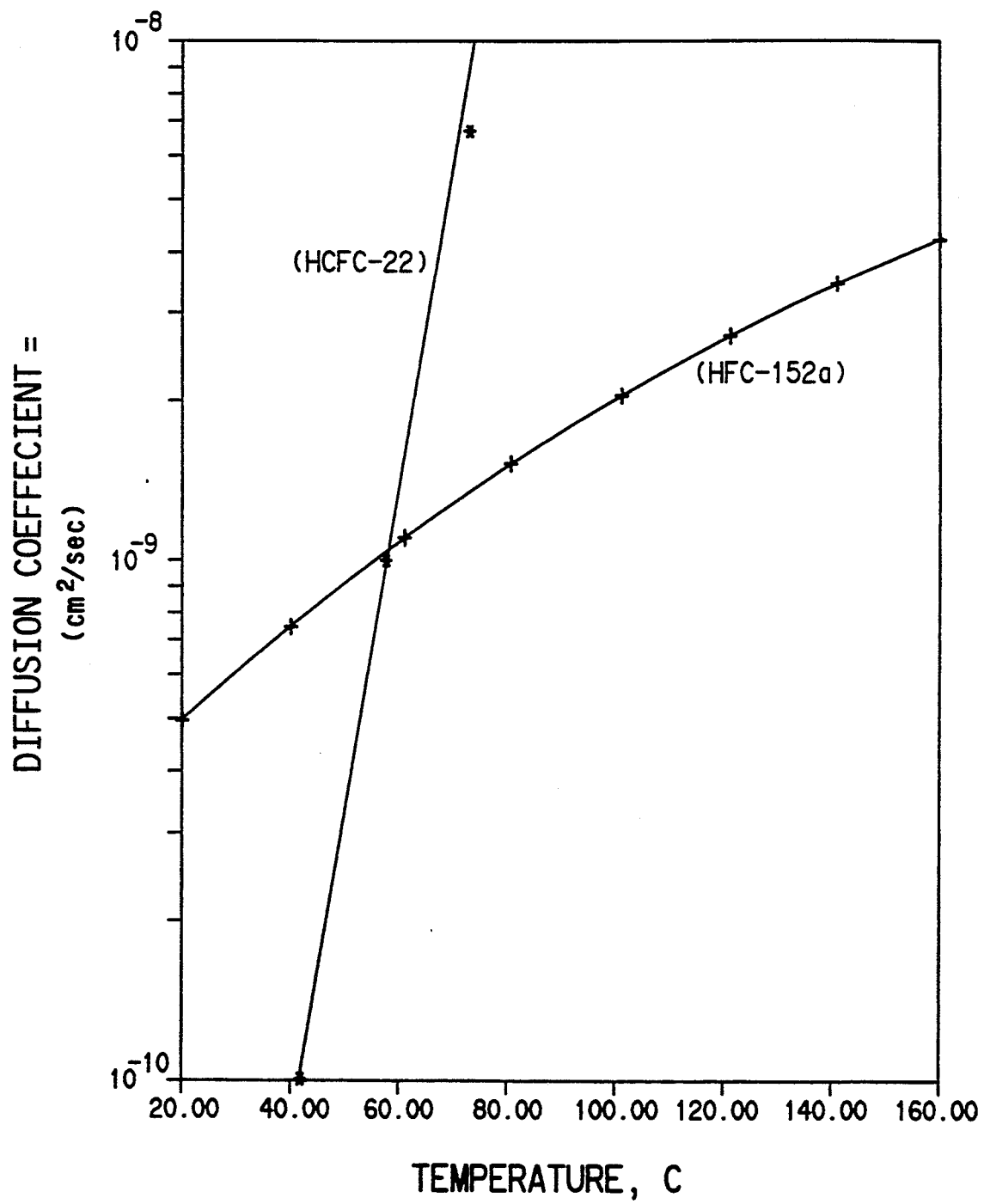
In FIG. 3, the diffusion coefficient of HFC-152a into polystyrene is presented at various temperatures from 20° C. to 160° C.

In FIG. 3, the diffusion coefficient of HFC-152a into polystyrene is presented at various temperatures from 20° C. to 160° C.

The permeation tests were conducted by a modification of ASTM D1434-82, "Standard Method for Determining Gas Permeability Characteristics of Plastic Film and Sheeting". This modified procedure is described in the Master of Chemical Engineering Thesis, P. S. Mukherjee, Widener University, Chester, Pa., February 1988, entitled "A Study of the Diffusion and Permeation Characteristics of Fluorocarbons Through Polymer Films":

(1) Using a Barber-Coleman press, 30 g samples polystyrene (as pellets) were pressed into 6"×6" sheets of film with 15–20 mil thickness. The pressing was done at 400° F. and at a pressure of about 35,000 psig (maintained for 5 minutes).

(2) Discs (15–20 mil thickness) were cut from 6"×6" sheets of film. Five discs of 47 mm diameter were made from each sheet. The discs were cut or stamped at ambient temperature using a die punch made of A-2 type steel (hardened).

(3) All tests were run at a 20 psia pressure differential between the high pressure side and the low pressure side of the permeation cell.

(4) Permeation tests were run at 20° to 160° C., with tests for each polystrene/gas combination being run at at least 5 temperatures.

Data for other temperatures were calculated from the equation:

$$\ln P = \frac{A}{T} + B$$

wherein P is permeation coefficient, T is °K. (C+273.2) and A and B are constants determined from the permeation coefficients calculated from the following equation:

$$P = \frac{(\text{Rate of Permeation})(\text{Film Thickness})}{(\text{Film Area})(\text{Pressure drop across film})}$$

(5) The permeation rates are based on a 1 cm² by 1 cm thick film with a 1.0 psia pressure drop across the film.

To obtain the permeation coefficient (P), the standard permeation equation is used. It is based on Fick's law of diffusion and Henry's law of solubility.

$$P = \frac{(\text{Rate of permeation})(\text{film thickness})}{(\text{film area})(\text{pressure drop across film})}$$

$$= \frac{(\text{cc of permeated gas at STP*})(\text{cm})}{(\text{sec})(\text{sq. cm})(P, \text{cm Hg})}$$

*at 0° C. and 1 atmosphere of pressure.

The diffusion coefficient for each experimental temperature was determined by extrapolating the straight-line plot of low-side pressure versus time, obtained in the permeation study to the time axis. This time, referred to as lag time in literature, is used to obtain the diffusion coefficient by means of this equation:

$$D = \frac{x^2}{6t}$$

where
D = diffusion coefficient, cm²/sec.
x = plastic film thickness, cm
t = lag time, seconds Based on the data shown in the figures, it is apparent that HFC-152a exhibits permeation characteristics similar to HCFC-22 with polystyrene. The permeation coefficients for HFC-152a are nearly identical to HCFC-22 but the diffusion coefficients differ. The diffusion coefficient for HFC-152a changes much less over the temperature range 20°–100° C. than the coefficient for HCFC-22. This is an indication of the solubility difference between the two compounds relative to polystyrene.

The foregoing indicates that HFC-152a is a good candidate for foaming polystyrene sheet for food service readily permeates from the foam but still provides effective post expansion (better than HCFC-22), because the remaining blowing agent is in the cells, not the polymer.

EXAMPLE 4 AND 5

In these examples, two different foam sheets were produced using a 4.5 inch/6 inch tandem extrusion line; Example 4, 10 g/100 square inches; Example 5, 17 g/100 square inches.

The manufacturing and test data are presented in Table 4.

TABLE 4

| | Example 4 (10 g/100 sq. in.) | Example 5 (17 g/100 sq. in.) |
|---|---|---|
| Formulation | | |
| Polystyrene (%) | 95.3 | 96.5 |
| HFC-152a (%) | 4.4 | 3.1 |
| Talc (%) | 0.4 | 0.4 |
| Foam Product | | |
| Thickness (mil) | 85 | 85 |
| Density (pcf) | 3.6 | 5.9 |
| Cell size (mil) | 3.9 | 8.0 |
| Foam Thickness After Post-Expansion (mils) | | |
| after 1 day | 197 | 211 |
| 2 days | 188 | 169 |
| 3 days | 187 | 189 |
| 4 days | 240 | 174 |
| 6 days | 244 | 204 |
| 7 days | 247 | 234 |
| 10 days | 224 | 198 |
| 14 days | 214 | 231 |
| 21 days | 250 | 214 |
| 24 days | 265 | 215 |

EXAMPLE 6

Polyethylene foam sheet was produced successfully using HFC-152a as the blowing agent in a commercial tandem extrusion system.

Foam was extruded through an annular die, then stretched over a mandrel with a diameter about 4 times that of the die to yield a foam tube which was then slit. The extruder and die operated at a pressure of about 750 psig, a resin melt temperature of about 210° F. and a rate of about 300 lbs/hr. The HFC-152a blowing agent was injected at a rate of 49.5-60 lbs/hr.

The data are summarized in Table 5:

TABLE 5

| Blowing agent (BA) | HCFC-152a |
| --- | --- |
| Die Pressure (psig) | 760 |
| Resin melt (°F.) | 208 |
| Resin extrusion rate (lbs/hr) | 295 |
| BA extrusion rate (lbs/hr) | 49.5-60 |
| Foam density (pcf) | 3.28 -2.15 |

I claim:

1. A process for producing a closed-cell polymer foam comprising heating a polystyrene resin to a temperature sufficient to provide a molten polymer; adding and mixing 1,1-difluoroethane, as blowing agent, with said molten polymer to provide a plasticized mixture; heating the mixture to a temperature and applying a pressure such that the plasticized mixture does not foam; thereafter, reducing the temperature of the mixture to increase its viscosity; extruding the plasticized mixture into a zone at a temperature and pressure sufficient to permit foaming.

* * * * *